United States Patent
Chen et al.

(10) Patent No.: US 12,243,113 B2
(45) Date of Patent: Mar. 4, 2025

(54) METHODS FOR ONLINE PEAK DEMAND REDUCTION OF LARGE LOAD USERS WITH ENERGY STORAGE DISCHARGE

(71) Applicant: City University of Hong Kong, Hong Kong (CN)

(72) Inventors: Minghua Chen, Hong Kong (CN); Si-Zhao Qin, Hong Kong (CN); Yanfang Mo, Hong Kong (CN); Qiulin Lin, Hong Kong (CN)

(73) Assignee: City University of Hong Kong, Hong Kong (CN)

( * ) Notice: Subject to any disclaimer, the term of this patent is extended or adjusted under 35 U.S.C. 154(b) by 535 days.

(21) Appl. No.: 17/650,089

(22) Filed: Feb. 7, 2022

(65) Prior Publication Data
US 2023/0306532 A1    Sep. 28, 2023

(51) Int. Cl.
*G06Q 50/06* (2024.01)
*H02J 3/14* (2006.01)

(52) U.S. Cl.
CPC .............. *G06Q 50/06* (2013.01); *H02J 3/144* (2020.01); *H02J 2310/60* (2020.01)

(58) Field of Classification Search
CPC ....... G06Q 50/06; H02J 3/144; H02J 2310/60
See application file for complete search history.

(56) References Cited

U.S. PATENT DOCUMENTS

2022/0041076 A1* 2/2022 Sadeghianpourhamami ............... G06Q 50/40

OTHER PUBLICATIONS

Y. Mo, Q. Lin, M. Chen, and S. J. Qin, "Optimal peak-minimizing online algorithms for large-load users with energy storage," in IEEE INFOCOM, 2021, poster paper.
Y. Shi, B. Xu, D. Wang, and B. Zhang, "Using battery storage for peak shaving and frequency regulation: Joint optimization for superlinear gains," IEEE Trans. Power Syst., vol. 33, pp. 2882-2894, 2017.
J. Qin, Y. Chow, J. Yang, and R. Rajagopal, "Online modified greedy algorithm for storage control under uncertainty," IEEE Trans. Power Syst., vol. 31, pp. 1729-1743, 2015.
J. Ma, S. J. Qin, T. Salsbury, and p. Xu, "Demand reduction in building energy systems based on economic model predictive control," Chem. Eng. Sci., vol. 67, pp. 92-100, 2012.
R. Urgaonkar, B. Urgaonkar, M. J. Neely, and A. Sivasubramaniam, "Optimal power cost management using stored energy in data centers," in Proc. SIGMETRICS, 2011, pp. 221-232.
M. P. Johnson, A. Bar-Noy, O. Liu, and Y. Feng, "Energy peak shaving with local storage," Sustain. Comput. Informatics Syst., vol. 1, pp. 177-188, 2011.

* cited by examiner

*Primary Examiner* — Gary Collins
(74) *Attorney, Agent, or Firm* — S&F/WEHRW

(57) ABSTRACT

A method of managing real-time electrical energy storage management from an electricity storage device to maximise the reduction of the use of a mains electricity grid during peak cost charging periods on the mains electricity grid, including: calculating an ideal offline use of the electricity storage device using ideal predicted parameters; calculate a plurality of electrical storage device storage and electrical discharge models using a plurality of algorithms based on recorded data; calculate the competitive ratio for each of the algorithms and the ideal offline use; and use power from the electricity storage device based on an optimal competitive ratio.

12 Claims, 6 Drawing Sheets

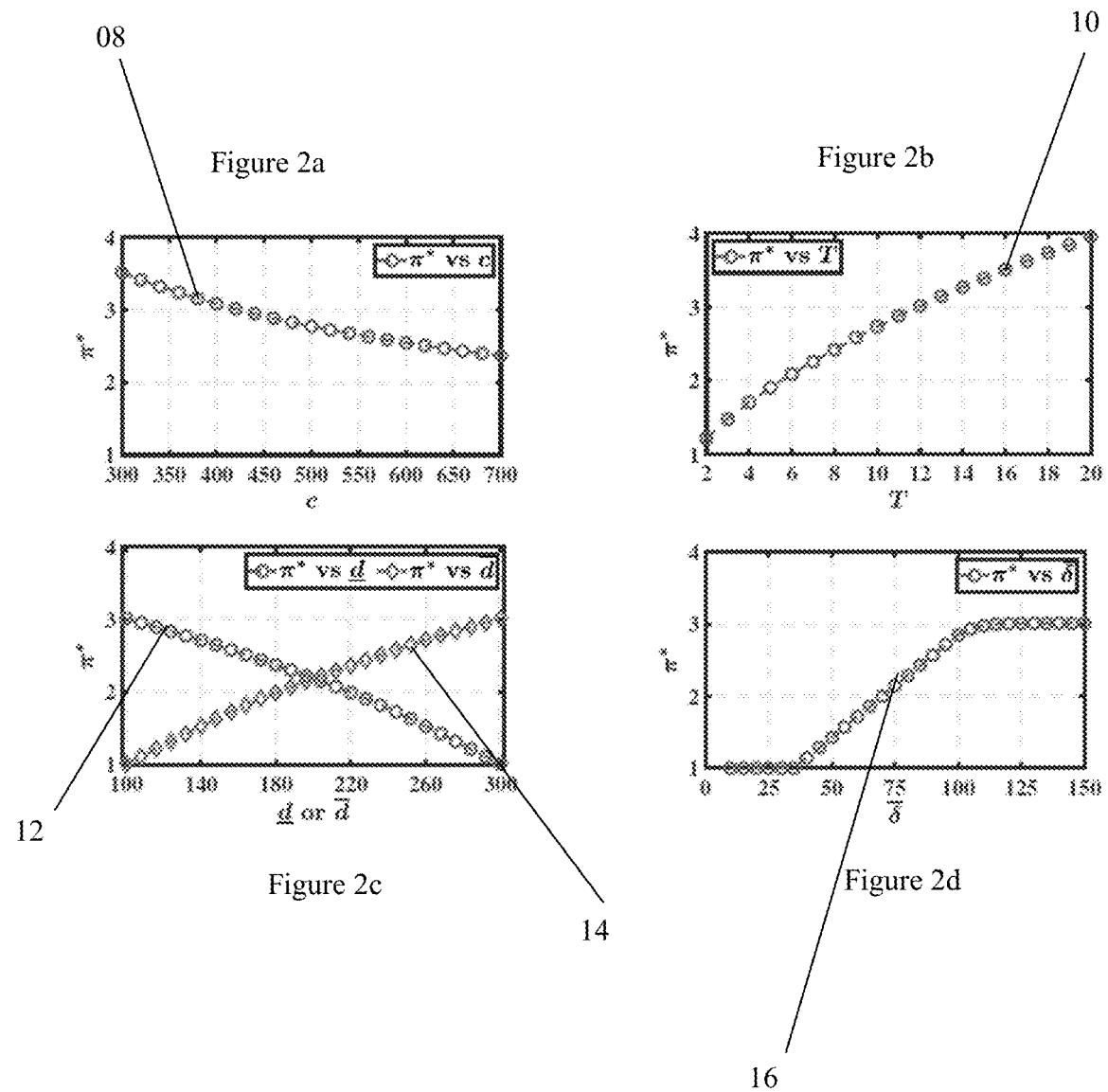

(a)

(b)

METHODS FOR ONLINE PEAK DEMAND REDUCTION OF LARGE LOAD USERS WITH ENERGY STORAGE DISCHARGE

TECHNICAL FIELD

The present invention generally relates to an maximize the peak-demand reduction that directly captures the economic benefits of using energy storage.

BACKGROUND ART

Reference to cited material or information contained in the text should not be understood as a concession that the material or information was part of the common general knowledge or was known in the US or any other country.

An increasing number of large-load customers are employing energy storage (e.g., fuel cells) to reduce the peak procurement from the grid, which accounts for up to 90% of their electricity bills.

As a typical demand response program, utilities exploit delicate pricing schemes for motivating customers to modify their power consumption patterns. A large-load consumer's electricity bill usually consists of two parts: volume charge and demand charge. The volume charge depends on the amount of consumed energy and time-based rates like time-of-use (TOU) pricing reflecting the energy cost over time. These pricing strategies promote load shifting to the off-peak hours with cheaper unit prices, but may cause rebound peaks, highlighting the second part of the bill.

The peak-demand charge, as a punitive charge on the maximum power consumption during a billing period, motivates large-load customers to flatten their demand curves. It is calculated by the average power over a specified interval, e.g., 15 or 30 minutes. According to CLP Power Hong Kong. 2020. Non-residential tariff of CLP. https://www.clp.com.hk/en/customer-service/tariff/business-and-othercustomers/non-residential-tariff, the demand charge rate and on-peak volume charge rate are around 118 HK dollars/kW and 55 HK cents/kWh respectively. It follows that the cost of lifting the peak demand is over 200 times that of increasing the off-peak energy consumption by one unit. Then, it is no surprise that the peak-demand often takes up a large portion of the bill, e.g., up to 90% for DC fast charging stations and 80% for Google data centres. Thus, for electricity cost saving, customers should pay particular attention to their peak demands.

Currently, customers exploit energy storage for cost-savings on their electric bills and possible arbitrage opportunities. This phenomenon raises researchers' interests along this line, with researchers assessing the storage value for energy arbitrage and regulation services in New York. Studies have explored time-average cost reduction opportunities of using existing storage, like UPS units of data centres. Another kind of existing storage refers to electric vehicles, and the economics of vehicle-to-grid services has been examined. The storage is valuable not only for commercial consumers, but also for residential customers. In addition to cost-saving, reducing emission footprint of the power grid using distributed energy storage is also known. In short, researchers are exploring the applications and potential financial interests of storage from various aspects.

Two known approaches to electricity cost saving are directly shifting partial loads from an on-peak period to an off-peak one and reducing peak demands. However, such methods are not always applicable, as certain loads cannot be shifted or cut. Meanwhile, bulk energy consumers increasingly invest in self-owned renewable generations, e.g., solar power systems, for green buildings and industries. These installations can reduce the amount of energy purchased from the grid. However, they may result in a more fluctuating net demand curve and not reduce the peak-demand charge because the renewable generations are highly volatile.

On the other hand, customers can utilize energy storage to reshape their electricity procurements from the grid, without directly changing their consumption profiles. The rapid development of storage technologies makes it convenient and economical to build and maintain a storage system. Energy storage has been useful to meet demand surges and provide uninterrupted power supply in power systems. It will also play a part in reducing the electric bill, especially the peak-demand charge of a large-load user.

Knowing the future demands, the best of energy storage may be achieved. Unfortunately, the small-scale demands are highly uncertain, and self-owned renewable generations even exacerbate the volatility of demands over time. Thus, the online setting is proceeded with, where an input sequence will be revealed sequentially in time, and the decision maker has to causally make irrevocable decisions at current time with less or no future information. In our problem, an input sequence refers to a series of demands over time and the operator causally determines the usage of the limited energy storage in each time interval.

Furthermore, we are challenged by the non-cumulative nature of peak consumption and the coupling of online decisions to maximize the peak-demand reduction by using the energy storage in real-time.

Stochastic optimization or model predictive control may be vulnerable to the inaccuracy of estimated models and sensitive to a volatile practical environment. Although robust optimization relies little on reliable predictions, it seldom deals with sequential decision making. Its focus on the worst-case outcome over an uncertainty set often makes the resulting algorithms computationally expensive and conservative.

The present invention applies online algorithm design with competitive analysis. While stochastic optimization and robust optimization emphasize the absolute performance, competitive online optimization concerns the relative performance compared to the optimal offline outcomes derived with perfect information. Specifically, it evaluates an online algorithm via competitive ratio (CR), relating to the worst-case ratio between the optimal offline and online outcomes under the same input sequence. Then, the best possible CR among all online algorithms captures the price of uncertainty for the considered online problem. Like robust optimization, competitive online optimization requires little accurate predictions. Moreover, its worst-case analysis is much less conservative, because of the offline-to-online relative performance measure, respecting the fairness in performance evaluation under different input sequences. However, it is not easy to identify the worst-case relative performance and develop online algorithms with the best CR, as we frequently encounter nonconvex and combinatorial problems at first sight. The present invention seeks to tackle these challenges and address the online storage-assisted peak-reduction.

The peak-demand charge has attracted attention from both utilities and large-load customers. It has been analysed that the adoption of demand charge given the competition of isolated industrial customers. An extended peak-demand charge has previously been considered which relates to the largest accumulated consumption over several periods. In the literature, researchers have studied multiple approaches for utilities and large-load customers in response to the peak-demand charge. Based on day-ahead load predictions, known research studies the joint optimization of peak shaving and frequency regulation with energy storage. Under a peak-based pricing model, the online economic dispatching of local generators has been considered in microgrids. Known studies examine the scheduling and the pricing of electric vehicle services under the electricity tariff with peak-demand charge. Overall, the peak-demand charge brings utilities and consumers for efficient and reliable power systems.

In the present invention, it is considered that a large-load consumer utilizes their energy storage to reduce the peak-demand charge. The present invention focuses on maximizing the peak-demand reduction brought by using energy storage. In contrast with directly considering the peak demand in a minimization problem, the present invention supposes that the reduction in the maximization problem emphasizes more on the benefit brought by the energy storage and provides a fairer comparison on the efficacy of algorithms under different uncertainty sets or demand profiles.

Online competitive analysis has been useful in electric vehicle charging and economic dispatching. The competitive analyses of cost minimization and utility maximization have different challenges. Although we can easily transform the problem from one to the other in the offline scenario, solutions and results for one problem may not directly apply to its counterpart in the online setting. The present invention considers online peak-demand reduction maximization.

The resulting algorithms of the present invention are parameterized by a ratio "pursued" in each decision-making round. Like model predictive control, the algorithms make the decision of each round with the help of an offline optimization problem. It turns out that the algorithms of the present invention are effective and efficient from theoretical analysis and empirical validations.

SUMMARY OF INVENTION

It is an object of this invention to provide to ameliorate, mitigate or overcome, at least one disadvantage of the prior art, or which will at least provide the public with a practical choice.

An objective of the present invention is to maximize the peak-demand reduction that directly captures the economic benefits of using energy storage. Despite the challenges of decision-making under future uncertainty, we develop an optimal online algorithm for the problem that achieves the best possible competitive ratio among all (deterministic and randomized) online algorithms. Moreover, we maintain the best possible competitive ratio at each decision-making round under the algorithm after solving a linear number of linear-fractional problems to find the best competitive ratio in polynomial time. We can also extend the algorithm to an adaptive one with improved average-case performance, in addition to the optimal worst-case performance.

The present invention provides a method of managing real-time electrical energy storage management from an electricity storage device to maximise the reduction of the use of a mains electricity grid during peak cost charging periods for a large-load electricity consumer, including: calculating an ideal offline use of the electricity storage device using ideal predicted parameters; calculate a plurality of electrical storage device storage and electrical discharge models using a plurality of algorithms based on recorded data; calculate the competitive ratio for each of the algorithms and the ideal offline use; and use power from the electricity storage device based on an optimal competitive ratio.

The method may select a representative ideal offline use at each decision-making juncture.

Preferably, one of the plurality of algorithms is an adaptive algorithm.

Preferably, the adaptive algorithm uses information revealed in earlier steps of the adaptive algorithms, Preferably, at least one of the plurality of algorithms calculates based on data in real time.

Preferably, at least one of the algorithms calculates the best possible competitive ratio.

Preferably, the competitive ratio is measured against at least one of the following:
scaled storage energy capacity;
the lower bounds of the net electricity demand;
the upper bound of the net electricity demand;
the maximum electrical discharge Preferably, an optimal competitive ratio is obtained by taking the maximum of an exponential number of linear-fractional programs and restricting the number of linear-fractional programs based on a specified number of time intervals T.

In a further embodiment, the present invention seeks to provide an algorithmic framework to design competitive online algorithms for the storage-discharging peak-reduction maximization problem for electricity discharge from an electricity storage device wherein each algorithm under the framework is parameterized by its competitive ratio (CR) and makes discharging decision for the electricity storage device at each of a number of rounds by maintaining the given competitive ratio.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which:

FIG. 2a is a plot of competitive ratio (CR) against scaled storage energy capacity;

FIG. 2b is a plot of competitive ratio (CR) against a number of time slots;

FIG. 2c is a plot of competitive ratio (CR) against lower and upper bounds of net demand at a time slot;

FIG. 2d is a plot of competitive ratio (CR) against maximum discharge amount per time slot;

In the drawings like structures are referred to by like numerals throughout the several views. The drawings shown are not necessarily to scale, with emphasis instead generally being placed upon illustrating the principles of the present invention.

DESCRIPTION OF EMBODIMENTS

Mathematical Model Definitions

Figure 1A:
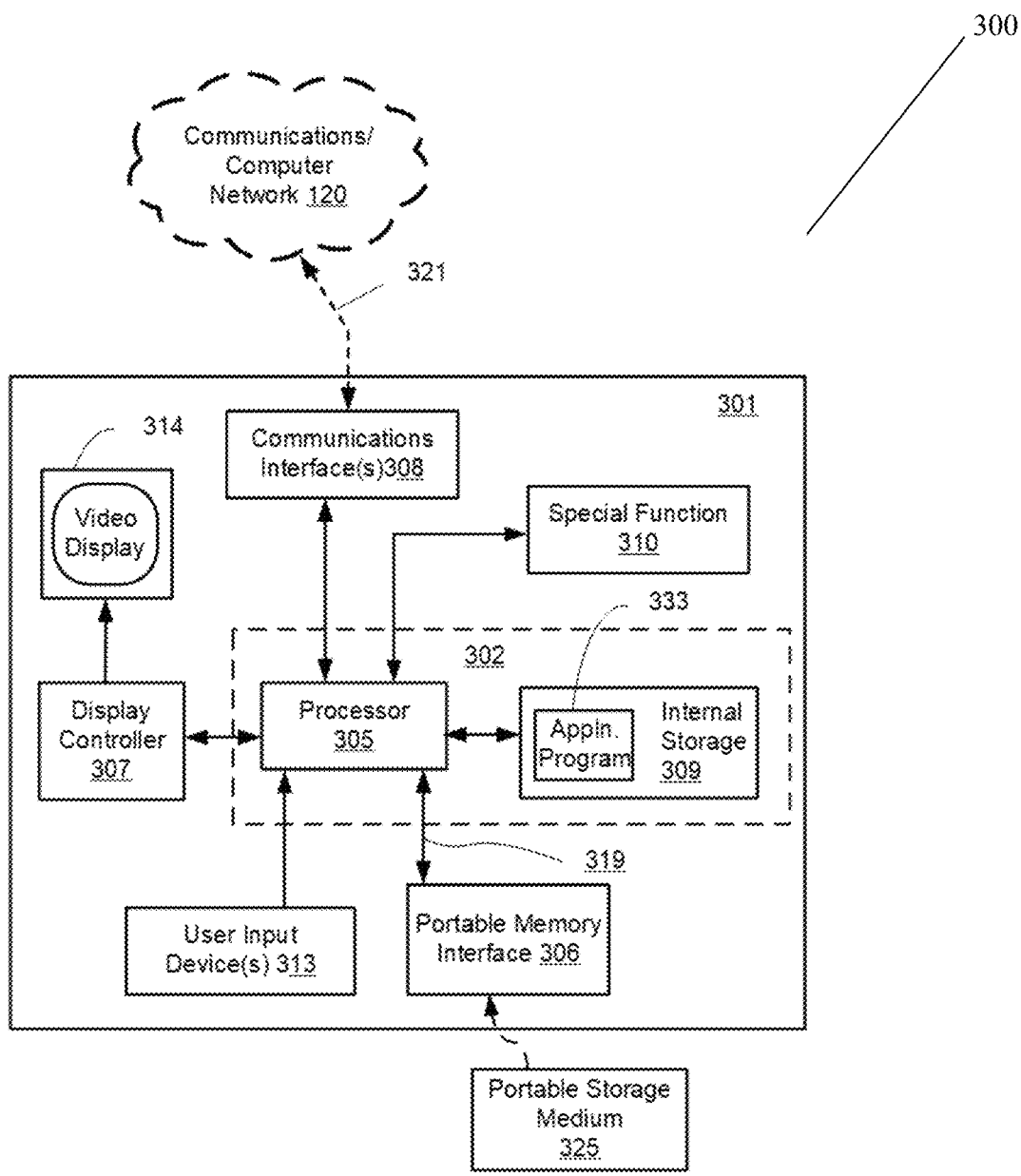
FIG. 1a is a schematic block diagram of a general-purpose computer system upon which arrangements described can be practiced.

FIG. 1a depicts a general-purpose computer system 300, upon which the various arrangements described below can be practiced.

As seen in FIG. 1a, the computer system 300 includes: a computer module 301; input devices 313; and output devices. An external Modulator-Demodulator (Modem) transceiver device may be used by the computer module 301 for communicating to and from a communications network 320 via a connection 321. The communications network 320 may be a wide-area network (WAN), such as the Internet, a cellular telecommunications network, or a private WAN The computer module 301 typically includes at least one processor unit 305, and a memory unit 306. For example, the memory unit 306 may have semiconductor random access memory (RAM) and semiconductor read only memory (ROM). The computer module 301 also includes a number of input/output (I/O) interfaces including: an audio-video interface 307 that couples to the video display 314; an I/O interface 313.

The present invention proceeds on the basis that the peak demand of a large-power customer may occur in T time slots of an on-peak period, e.g. from 9 a.m. to 10 p.m. for a shopping centre/mall/precinct. Each slot corresponds to 15 or 30 minutes by the power measurement for the peak-demand charge. Knowing the slot duration, we can convert the average power demand (in kW) into the consumed energy (in kWh) for each time slot.

Net electricity demand: The present invention considers a general setting where the excess renewable generation cannot recharge the storage system. The self-owned renewable generations are not sufficient to cover the gross demand of the large-load customer during the T slots. Then, $d \in \mathbb{R}^T$ is used to denote the net demand profile, which is given by the difference between the gross demand and the renewable generation. Although the cost of renewable generation is negligible, the volatile renewable generations exacerbate the unpredictability of net demands over time. Consequently, it is hard to estimate $d_t$ accurately in previous time slots. We just know the lower and upper bounds of the net demand in a future time slot. For brevity, we herein focus on the case with uniform bounds, namely $d_t \in [\underline{d}, \overline{d}]$ for all $t \in [T]$, while our approach also applies to the case with time-variant bounds after slight modifications.

TABLE 1

A summary of symbols.

| Symbols | Meanings |
| --- | --- |
| C | Scaled storage energy capacity (kWh) |
| T | Number of time slots |
| d | A demand profile $d = [d_1, d_2, \ldots, d_T]' \in \mathbb{R}^T$, where $d_t$ is the net demand at time slot t (kWh) |
| $\underline{d}, \overline{d}$ | Lower and upper bounds of the net demand at a time slot (kWh) |
| $\delta_t$ | Discharge amount at time slot t, $\delta_t \geq 0$ (kWh) |
| $\overline{\delta}$ | Maximum discharge amount per time slot (kWh) |
| v(d) | Peak usage of the optimal offline solution under the demand profile d |
| σ(d) | Peak-demand reduction of the optimal offline solution under the demand profile d |
| δ(π, d) | Discharge vector of pCR-PRM(π) under the demand profile d |
| π* | The best possible CR among all online algorithms |
| $\pi_t^*$ | Adaptive CR at time slot $t \in [T]$ |
| [n] | The set $[1, 2, \ldots, n]$ for $n \in \mathbb{N}$, wherein [0] reduces to the empty set |
| $[x]^+$ | The maximum of 0 and $x \in \mathbb{R}$ |
| X\Y | $\{x \mid x \in X \,\&\, x \notin Y\}$ for two sets X and Y |

Energy storage: Let c (in kWh) be the energy storage capacity scaled by a factor concerning the maximum depth of discharge and the discharging efficiency. Let $\overline{\delta}$ (in kWh) denote the maximum discharge amount per time slot. We can hybridize different energy storage technologies with complementary characteristics. For example, flywheel and supercapacitors are high power devices, while fuel cells and pumped hydro are high energy devices. In this way, the desired c and $\overline{\delta}$ can be obtained to meet long-term energy needs and short-term power needs. The present invention considers the scenario with fully charged energy storage before the on-peak period and discharge the storage in the on-peak duration to reduce the peak-demand. The discharging vector is denoted by $\delta = [\delta_1, \delta_2, \ldots, \delta_T]' \in \mathbb{R}^T$, where $\delta_t$ (in kWh) is the discharge amount at time slot t. Then, the characteristics of the storage system leads to the capacity constraint $$\sum_{t=1}^{T} \delta_t \le c$$

and the rate constraints $\delta_t \le \bar{\delta}$, for all $t \in [T]$.

Problem Formulation

The present invention formulates and studies the following peak-demand reduction maximization (PRM) problem with a capacity constraint and discharging rate constraint, $$PRM: \max_{\delta \in \mathbb{R}^T} \max_{t \in [T]} d_t - \max_{t \in [T]} (d_t - \delta_t) \quad (1)$$

$$\text{subject to } \sum_{t=1}^{T} \delta_t \le c;$$

$$0 \le \delta_t \le \min\{\bar{\delta}, d_t\}, \text{ for all } t \in [T]$$

The objective represents the peak-demand reduction introduced by the energy storage. If there is no storage, the peak usage under the demand profile d is $\max_{t \in [T]} d_t$. After applying the discharging vector $\delta$, the peak usage is reduced to $\max_{t \in [T]} (d_t - \delta_t)$. The discharging vector should satisfy the capacity and discharging rate constraints. Moreover, each discharge amount should not exceed the demand of the corresponding slot. The present invention seeks to maximize the peak-demand reduction by using energy storage, directly relating to the cost reduction on the peak-demand charge. Most existing studies consider the peak minimization objective, namely, $\min_\delta \max_{t \in [T]} (d_t - \delta_t)$. In contrast, the present invention adopts the peak-demand reduction maximization objective in PRM, because it focuses on the benefit brought by the energy storage. The two objectives are consistent in the offline setting because their summation remains a known constant $\max_{t \in [T]} d_t$ under any feasible solution. Notwithstanding, the two objectives should be differentiated in the online setting where we lack the information of $\max_{t \in [T]} d_t$. Moreover, in the online setting, the performance guarantee over an uncertainty set of the demand profiles is considered. It is clear that $\max_{t \in [T]} d_t$ is non-constant among different demand profiles. Considering a peak-reduction value relative to $\max_{t \in [T]} d_t$ instead of the absolute peak-demand value $\max_{t \in [T]} (d_t - \delta_t)$ provides a fairer performance comparison among different demand profiles.

Optimal Offline Solution

When the demand profile d is known, the PRM problem can be easily solved by linear programming. Moreover, the following proposition states that the optimal offline solution to PRM presents a particular threshold-based structure.

Proposition 1. Given a demand profile $d \in \mathbb{R}^T$, there exists $v \in \mathbb{R}$ with $$\sum_{t=1}^{T} \left[ d_t - v \left[ \max_{t \in [T]} [d_t - \bar{\delta} - v]^+ \right]^+ \right]^+, \text{ for all } t \in [T]$$

Note that $[x]+ \triangleq \max\{x, 0\}$. A useful observation is that the optimal solution to PRM is also optimal for the peak-demand minimization problem with the same constraints. For notational convenience, $v(d)$ and $\sigma(d)$ are used to denote the optimal peak usage and the optimal peak-demand reduction after discharging the stored energy, namely, $$v(d) = \max_{t \in [T]} (d_t - \delta_t^*) \text{ and } \sigma(d) = \max_{t \in [T]} d_t - \max_{t \in [T]} (d_t - \delta_t^*)$$

where $\delta^*$ is the optimal solution to PRM. While solving the offline PRM problem is easy, it is challenging to determine the discharge amounts in real-time without knowing future demands.

Figure 1B:
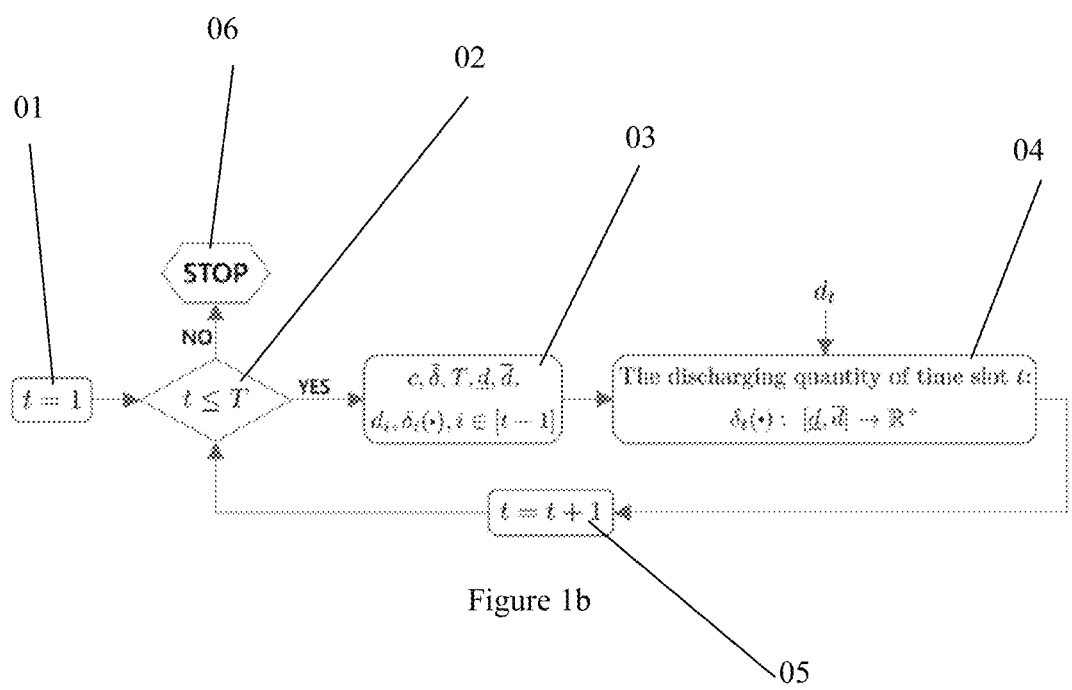
FIG. 1b is a flow chart illustrating an online algorithm for peak-demand reduction maximisation (PRM)

The present invention's optimal algorithm makes the decision of each round by maintaining an offline-to-online ratio to be no more than the best CR. Clearly, the best possible CR varies as the time-slot number (T) is changed, the demand bounds ($\underline{d}$ and $\bar{d}$), the storage capacity (c), and the maximum discharging limit ($\bar{\delta}$). In general, computing the best CR involves hard min-max optimization and having to resort to dynamic programming which is time-consuming and computationally expensive. Fortunately, as a unique technical contribution, the present invention demonstrates that the best CR can be obtained for the online PRM by solving a linear number of linear-fractional programs in parallel. In the online setting, the exact value of $d_t$ is not known until time slot t. The empirical information only tells us that $d_t \in [\underline{d}, \bar{d}]$, for all $t \in [T]$. We denote the set of all possible demand profiles by $\mathcal{D} = \{d \in \mathbb{R}^T | \underline{d} \le d_t \le \bar{d}, \forall t \in [T]\}$. Other prior information includes the storage capacity (c), the maximum discharging limit $\bar{\delta}$ and the time-slot number (T). FIG. 1, is an illustrative flowchart of an online algorithm for PRM. From initiating step 01, where at time slot t=1, at step 2 02 the algorithm establishes if the number of time slots passed exceeds the total number of available time slots T, if yes, the algorithm stops at stop step 06. If not the discharge quantity over time slot t for optimal peak demand reduction maximization is measured at measuring step 04. The next time slot interval t is added at time addition step 05. The process is repeated until time slot t equals or exceeds the maximum time slots T. Concerning robustness and fairness, CR is a proper measure in online optimization with given resources. It quantifies the relative performance between an online algorithm and the optimal offline benchmark. For a maximization problem like PRM, the CR of a deterministic online algorithm $\mathcal{A}$ is defined as the largest ratio between the objective value under an optimal offline solution and that attained by the algorithm over all possible input sequences (e.g., the demand profiles in PRM), namely, $$CR_{\mathcal{A}} = \max_{d \in \mathcal{D}} \frac{\sigma(d)}{\sigma_{\mathcal{A}}(d)},$$

where $\sigma_{\mathcal{A}}(d)$ refers to the objective values of PRM under the online algorithm and the input sequence d. For a randomized algorithm $\mathcal{A}$, the concept of CR can be extended by replacing $v(d)$ with $E[v_{\mathcal{A}}(d)]$, where the expectation is due to the random strategies of the algorithm $\mathcal{A}$. There is always CR≥1 and a smaller CR indicates that the algorithm can perform more closely to the optimal offline case with perfect information. We expect to find the online algorithm with the smallest CR, which is the best possible CR among all online algorithms. The best CR not only verifies the optimal performance of the online algorithm, but also quantifies the essential cost of not knowing the future. In other words, the best CR captures the price of uncertainty in the considered online problem.

Proposition 2. For any randomized algorithm $\mathcal{A}$, there exists a deterministic online algorithm $\mathcal{B}$ such that $E[\sigma_{\mathcal{A}}(d)] \le \sigma_{\mathcal{B}}(d)$ over all possible input sequence $d \in \mathcal{D}$.

The present invention asks whether there exists an online algorithm with given CR. This question relates to a useful framework for designing competitive online algorithms, called CR-Pursuit. As the name indicates, the CR-Pursuit algorithmic framework requires us to sequentially make online decisions by "pursuing" a prescribed CR. For a maximization problem and a given CR, each CR-Pursuit algorithm will choose actions to maintain an offline-to-online objective ratio to be no more than the CR, in each decision-making round. Despite the conciseness of the idea, there is no general recipe for pursuing the given CR. The means of designing algorithms under CR-Pursuit is problem-specific.

Several useful observations regarding the CR-Pursuit framework are now presented. First, to maintain the offline-to-online ratio in each decision-making round, it is usually needed to solve an offline problem according to the observed inputs and implemented actions so far. If the offline version of a considered problem is easier, then it is less challenging to design algorithms under CR-Pursuit. Second, the CR-Pursuit framework generally generates a family of algorithms, each of which is characterized by a specific CR. Clearly, the best algorithm among these is the one with the smallest CR. Whether the best algorithm under CR-Pursuit is optimal among all online algorithms is questioned. If so, then the CR-Pursuit framework greatly reduces the search space of optimal online algorithms. Overall, there are three main challenges in designing CR-Pursuit algorithms: finding a proper way to sequentially maintain a given CR, identifying the best CR which can be pursued, and checking whether the best CR under CR-Pursuit is the optimal one among all online algorithms. In the following, these challenges are approached with the online PRM. Firstly, a collection of online algorithms under the CR-Pursuit framework is devised. Then, the best algorithm among these is also optimal among all online algorithms for PRM is shown. Finally, the best online algorithm for PRM by finding the best possible CR is obtained.

Algorithm 1: pCR-PRM ($\pi$)
for t=1, 2 . . . . T do
The discharge amount at time slot t is given
by $\delta_t(\pi, d) = [d_t - \max_{k \in [t]} d_k + \sigma(d^r)/\pi]^+$ Without knowing future inputs, it seems impossible to maintain the offline-to-online objective ratio to be no more than a given ratio. If the time-slot number T is not known, it can be assumed that there are no future inputs. However, in the online PRM, by the facts that T is known and the future inputs will affect the online and optimal offline peak-demand reductions presents a challenge. As a result, a reference input is introduced and adaptively update it at each time slot t∈ [T]. Specifically, the reference input sequence is set at time slot t as $$d^r = [d_1 d_2 \ldots d_t \underline{d} \ldots \underline{d}]'$$

The reference input sequence is a combination of the observed demands until time slot t and the lowest possible future demands, indicating the most optimistic forecast. Given a ratio $\pi$, we shall apply CR-Pursuit framework and maintain the offline-to-online ratio under the reference input sequence $d^r$ to be more than $\pi$ at each time slot t. To this end, a family of algorithms is designed, each of which is characterized by a prescribed ratio $\pi$ and called pCR-PRM($\pi$). The details of pCR-PRM($\pi$) are given in Algorithm 1. For notational convenience, we use $\delta(\pi, d)$ to denote the output sequence of pCR-PRM ($\pi$) under an input sequence d.

Two issues arise. First, pCR-PRM($\pi$) may generate infeasible solutions to PRM. Second, whether the formula in Algorithm 1 can maintain the offline-to-online objective ratio under $d^r$ to be no more than $\pi$, for all t∈[T] is questioned. For the first issue, the following definition in terms of feasibility of pCR-PRM algorithms is given.

Definition 3. pCR-PRM($\pi$) is feasible if, for any d∈ $\mathcal{D}$, the solution $\delta(\pi, d)$, is feasible for PRM.

We address the second issue by the following lemma.

Lemma 4. Given pCR-PRM($\pi$), it holds for any d∈ $\mathcal{D}$ that $$\max_{k \in [t]} d_k - \max_{k \in [t]} (d_k - d_k(\pi, d)) \geq \sigma(d^r)/\pi, \text{ for all } t \in [T].$$

Therefore, we conclude that pCR-PRM($\pi$) can maintain the given CR $\pi$ if and only if it is feasible. Identifying the best pCRPRM algorithm is equivalent to finding the smallest n such that pCR-PRM (x) is feasible. To this end, we shall first characterize the set of all ratios such that the corresponding pCR-PRM algorithms are feasible. For this purpose, we define an inventory function, which maps a given ratio $\pi$ to the maximum accumulated discharge amount over all possible demand profiles under pCR-PRM($\pi$):

$$\Phi(\pi) = \max_{d \in \mathcal{D}} \sum_{t=1}^{T} \delta_t(\pi, d).$$

We show below that the feasibility of pCR-PRM($\pi$) is mainly subject to the capacity constraint.

Proposition 5. pCR—PRM ($\pi$) is feasible if and only if $\Phi(\phi) \leq c$.

The following lemma unravels the monotonicity of $\Phi(\pi)$.

Lemma 6. The function $\Phi(\pi)$ is non-increasing and strictly decreases in $\pi$ when $\Phi(\pi) > 0$ From Lemma 6, it is seen that there exists a ratio $\overline{\pi} > 1$ such that pCR-PRM($\pi$) is feasible only if $\pi \geq \overline{\pi}$. We shall show that pCR-PRM($\overline{\pi}$) is the best pCR-PRM algorithm. More importantly, the best pCR-PRM algorithm also attains the optimal CR among all online algorithms for PRM, as stated in the following theorem:

Theorem 7. Given c, $\delta$, T and $\mathcal{D}$, the unique solution $\pi^*$ to the equation $\Phi(\pi) = c$ is the best possible competitive ratio among all online algorithms for PRM.

The above theorem indicates that the solution to $\Phi(\pi) = c$ characterizes the price of uncertainty regarding the online PRM. To find the best online algorithm for PRM, it suffices to search for the best feasible pCR-PRM algorithm. In the next subsection, we shall show an efficient way to find the best possible CR $\pi^*$.

Deriving the analytic expression of $\pi^*$ over parameters (c, $\delta$, T, $\underline{d}$, $\overline{d}$) is attractive but challenging. Instead, the present invention explores efficient numerical methods for the best CR $\pi^*$. As a unique technical contribution, we show that computing $\pi^*$ is not much harder than linear programming. Specifically, we first show that the best CR $\pi^*$ is the maximum of an exponential number of linear-fractional programs. Then, we exploit the problem structure and show that only a linear number of such programs are necessary in terms of the time-slot number T.

Recall the key formula and the feasibility condition ($\Phi(\pi) \leq c$) of pCR-PRM($\pi$). We see that pCR-PRM($\pi$) is feasible if and only if for any nonempty subset I of the index set [T] and any d∈ $\mathcal{D}$, it holds that $\Sigma_{i \in I}[d_i - \max_{k \in [i]} d_k + \sigma(d^i)/\pi]^+ \leq c$. It follows that $$\frac{\sum_{i\in I}\sigma(d^i)}{c+\sum_{i\in I}(\max_{k\in[i]}d_k-d_i)}\leq \pi$$

worst-case input sequence for pCR-PRM ($\pi^*$) refers to a demand profile $\in \mathcal{D}$, under which the pCR-PRM ($\pi^*$) algorithm will use up the storage, namely $$\sum_{t=1}^{T}\delta_t(\pi^*, d) = c.$$

Since $\Phi(\pi^*)=c$, there exists a worst-case input sequence for pCR-PRM($\pi^*$). Let d' be a worst case input sequence and I* be the set $\{i\in[T]|\delta_t(\pi^*,d^*)>0\}$. Then, we observe that the equality in Formula (2) holds under the index set I* and the input sequence d*. Therefore, we attain the following proposition.

Proposition 8. Given c, $\bar{\delta}$, T and $\mathcal{D}$, the best possible CR for the online PRM is given by $$\pi^* = \max_{I\subseteq[T], d\in\mathcal{D}} \frac{\sum_{i\in I}\sigma(d^i)}{\sum_{i\in I}(\max_{k\in[i]}d_k-d_i)}$$

Proposition 8 follows directly from Lemma 6 and Proposition 5. Equipped with proposition 8, we shall transform the computation of the best CR $\pi^*$ into solving a sequence of linear-fractional programs. Before proceeding, we observe that $\sigma(d)=\max_{t\in[T]}d_t-v(d)$ and the largest element in $d^r$ appears in the first t elements. Moreover, we introduce a useful lemma below.

Lemma 9. Given x>y>0 and z>0, it follows that $$\frac{x+z}{y+z}\leq \frac{x}{y}$$

Next, we shall define a family of linear-fractional programs. Each program is parameterized by a nonempty set $I\subseteq C[T]$ and its optimal objective value gives a lower bound of the best CR $\pi^*$:

$$\max_{I,d\in\mathcal{D},u_j,\delta_{ij}} \frac{\sum_{i\in I}\sigma(m_i-u_i)}{c+\sum_{i\in I}(m_i-d_i)} \quad \text{CR-Comp(I)}$$

Subject to $\sum_{j=1}^{T}\delta_{ij}\leq c$, for all $i\in[T]$;

$0\leq \delta_{ij}\leq \bar{\delta}$, for all $i,j\in[T]$;

$d_j - d_{ij}\leq u_i$, for all $1\leq j\leq i\leq T$;

$\underline{d} - d_{ij}\leq u_i$, for all $1\leq i<j\leq T$;

$d_k\leq m_i$, for all $k\in[i]$ and $i\in I$.

Now, let us interpret the variables, constraints and objective of CR-Comp(I). Auxiliary variables $m_i$, $i\in[T]$ are related to $\max_{k\in[i]}d_k$. More specifically, by Lemma 9 and the constraints on the last line, CR-Comp(I) will attain its optimum when $m_i=\max_{k\in[i]}d_k$, for all $i\in I$. The remaining constraints of CR-Comp(I) are associated with the offline PRM problem solved at each time slot under a pCR-PRM algorithm. Precisely, for each $i\in[T]$, the variable $v_j$ and the variables $\delta_{ij}$, $j\in[T]$ are respectively related to the optimal objective value and the optimal solution to PRM under the demand profile $d^i$. CR-Comp(I) will attain its optimum when $v_i=v(d^i)$, for all $i\in I$. Moreover, the objective function of CR-Comp(I) corresponds to the left part of Formula (2), noting that $\sigma(d^i)=\max_{k\in[i]}d_k-v(d^i)$. With a slight abuse of notation, we also use CR-Comp(I) to denote the optimal objective value of the linear-fractional program. As a whole, by Lemma 9, Proposition 8, and the above analysis, we attain the following proposition.

Proposition 10. For each nonempty set $I\subseteq[T]$, it holds that $$CR\text{-}Comp(I) = \max_{d\in\mathcal{D}} \frac{\sum_{i\in I}\sigma(d^i)}{c+\sum_{i\in I}(\max_{k\in[i]}d_k-d_i)}$$

Thus, by Proposition 8 and Proposition 10, we conclude that the best possible CR $\pi^*$ equals $\max_{I\subseteq[T]}$ CR-Comp(I). That is to say, we can compute $\pi^*$ by solving a collection of linear-fractional programs CR-Comp(I). Recall that we can convert CR-Comp(I) into an equivalent linear program. Thus, computing $\pi^*$ is not much harder than solving a collection of linear programs. Moreover, we can compute these programs in parallel, since none of the CR-Comp(I) programs relies on the solution to another. Nevertheless, a direct application of the above results requires to solve an exponential number of linear programs, which is undesirable. Thus, we are motivated to exploit the structure of pCR-PRM ($\pi^*$) and exclude as many redundant programs as possible. To this end, we derive the following lemma. It identifies a particular worst-case input sequence for pCR-PRM ($\pi^*$), which continuously discharge stored energy until using up the capacity.

Lemma 11. There exists a worst-case input sequence $d\in\mathcal{D}$ for pCR-PRM ($\pi^*$) such that $\delta_t(\pi^*, d)=0$ if t is greater than a certain index and $\delta_t(\pi'. d)>0$ otherwise.

By Proposition 8, Proposition 10, and Lemma 11, we see that there exists $k\in[T]$ such that $\pi^*=$CR-Comp ([k]). Thus, we have the following theorem stating that only a linear number (T) of CR-Comp(I) programs are necessary for the best possible CR $\pi^*$, instead of the exponential number $2^T$.

Theorem 12. The best possible competitive ratio $\pi^*$ for the online PRM is given by $$\pi^* = \max_{I\in\{[t]|t\in[T]\}} CR\text{-}Comp(I).$$

In FIGS. 2a, 2b, 2c and 2d, we illustrate how the best possible CR $\pi^*$ varies as each of the parameters (c, $\bar{\delta}$, T, $\underline{d}$, $\bar{d}$) changes. We observe that the optimal CR $\pi^*$ increases as T increases and c decreases. $\pi^*$ becomes smaller when $\underline{d}$ and $\bar{d}$ get closer as the uncertainty set is shrinked. Moreover, the best CR $\pi^*$ is non-decreasing in $\bar{\delta}$. Particularly, when $\bar{\delta}$ is small enough, e.g., $\bar{\delta}\leq c/T$, the best reduction for both online and offline is $\bar{\delta}$, and the optimal CR is one. Contrary to this, when $\bar{\delta}$ is large enough, the rate constraint will not be active in the offline problem to be solved in each round of pCR-PRM ($\pi^*$) under the worst-case input sequence; consequently, the best CR $\pi^*$ remains constant when $\bar{\delta}$ increases.

While pCR-PRM($\pi^*$) attains the optimal CR among all online algorithms for PRM, it merely focuses on the worst-case performance, which may restrict its performance in practice. We herein extend the pCR-PRM($\pi^*$) algorithm by adaptively exploiting the revealed information of previous slots. Here is the intuitive idea: when we realize from the observed inputs that the net demand profile is by no means a worst-case input sequence, we should be more opportunistic and attempt to maintain smaller ratios in the following time slots. In this way, we can improve the average-case performance and still attain the optimal worst-case performance. The underlying reason lies in that the price of future uncertainty changes as we observe more inputs and capturing such variations is critical to the improvement of online decisions. Overall, the results in this section suggest the potential of merging efficiency into robustness.

---

Algorithm 2: Adaptive pCR-PRM Algorithm

--- for t = 1,2 ... T do
  Obtain $\pi_t^*$ according to Algorithm 3, the discharge amount at time slot t is given by $$\delta_t(\pi, d) = \left[d_t - \max_{k \in [t]} d_k + \sigma(d^i)/\pi_t^*\right]^+$$

---

Algorithm 3. A bisection Method for $\pi_t^*$ in the Adaptive pCR-PRM Algorithm

---

Input: c, T, $\underline{d}$, $\overline{d}$, observed inputs $d_k$, k$\in$[t], implemented
  actions $\delta_k$, k$\in$[t − 1], and $\pi_{t-1}^*$;
Output: The adaptive CR at time slot t under the adaptive
  pCR-PRM: $\pi_t^*$;
  $\pi_{lb} = \pi_t^{lb}$, $\pi_{ub} = \pi_{t-1}^*$,
  q = $\max_{I \in I_t}$ AdaCR − Threshold($\pi_{lb}$, I);
  if q $\leq$ (c − $\Sigma_{k=1}^{t-1} d_k$) then
    | $\pi_t^* = \pi_{lb}$,
    ∟ return
  while $\pi_{ub} − \pi_{lb} \geq \epsilon$ do
    | $\pi = (\pi_{lb} + \pi_{ub})/2$
    | q = $\max_{I \in I_t}$ AdaCR − Threshold ($\pi$, I);

$$\begin{cases} \pi_{lb} = \pi & \text{if } q > \left(c - \sum_{k=1}^{t-1} d_k\right); \\ \pi_{ub} = \pi & \text{otherwise}; \end{cases}$$

∟
  $\pi_t^* = \pi_{ub}$;

---

With respect to the real-time information, we first extend the concept of CR to a time-variant adaptive CR for every online algorithm for PRM at each time slot t. Specifically, we make the following definition.

Definition 13. Given revealed inputs $d_k$, k$\in$[t], the adaptive CR at time slot t of an online algorithm $\mathcal{U}$ is defined as $$\pi_t^\mathcal{U} = \max_{x \in \mathcal{D} \& x_k = d_k, \text{for all } k \in [t]} \frac{\sigma(x)}{\sigma_\mathcal{U}(x)}.$$

Let $\mathcal{A}_t$ be the set of online algorithms whose first (t−1) outputs are $\delta_k$, k$\in$[t−1] given that the first (t−1) inputs are $d_k$, k$\in$[t−1]. Then, considering the observed inputs $d_k$, K$\in$[t] and implemented actions $\delta_k$, k$\in$[t−1] so far, the best adaptive CR at time slot t is given by $$\pi_t^* = \min_{\mathcal{U} \in \mathcal{A}_t} \pi_t^\mathcal{U}.$$

Similarly to before, the best adaptive CR at time slot t characterizes the price of uncertainty at time slot t, without knowing the demands of future time slots indexed by k>t. Specifically, an online algorithm can at best maintain the online-to-offline ratio of peak-demand reduction to be $\pi_t^*$, for all future inputs. It is clear that $\pi_t^*$ is subject to the observed inputs and actions, for all t$\in$[T]. Based on the introduction of best adaptive CRs, the adaptive extension of pCR-PRM is introduced.

At each time slot t, the adaptive pCR-PRM maintains the online-to-offline ratio of the peak-demand reduction to be no more than the best adaptive CR $\pi_t^*$ instead of a constant CR $\pi^*$. We present the pseudocodes of the adaptive pCR-PRM in Algorithm 2.

The remaining issue is on characterizing $\pi_t^*$ the best adaptive CR at each slot. To proceed, we rely on the following observations.

We observe that the best adaptive CR $\pi_1^*$ is no more than the best CR $\pi^*$, because we exploit the additional information $d_1$. Since the adaptive pCR-PRM algorithm makes decisions by pursuing the best adaptive CR at each time slot, we conclude that the sequence $\pi_t^*$, t$\in$[T] is nonincreasing in t, $\pi_t^* \leq \pi_{t-1}^*$, $\forall t \in [T]$.

Given the online actions before time slot t, $d_k$, k$\in$[t−1], the online peak-demand reduction under the demand profile $d^t$ is no more than $\max_{k \in [t]} d_k - \max_{k \in [t-1]} (d_k - \delta_k)$. Thus, defining $$\pi_t^{ib} \triangleq \frac{\sigma(d^t)}{\max_{k \in [t]} d_k - \max_{k \in [t-1]} (d_k - \delta_k)},$$

we have $\pi_t^* \geq \pi_t^{lb}$.

Based on these observations, we shall show how to search for $\pi_t^*$ by a bisection method. To this end, in the following, given observed inputs $d_k$, k$\in$[t] and implemented decisions $\delta_k$, k$\in$[t−1], we define a linear program parameterized by a ratio $\pi \in [\pi_{lb}^t, \pi_{t-1}^*]$ and a set I$\in$Idt, where $I_t$={[k]\[t] k=t, t+1, ..., T}:

$$AdaCR\text{-}Threshold(\pi, I): \left[d_t - \max_{k \in [t]} d_k + \sigma(d^t)/\pi\right]^+ +$$

$$\max_{v_i, \delta_{ij}, d_i, i \in I} \sum_{i \in I} d_i - m_i + (m_i - v_i)/\pi$$

subject to $\sum_{j=1}^{T} \delta_{ij} = c$, for all $i \in T$;

$0 \leq \delta_{ij} \leq \overline{\delta}$, for all $i \in T$ and $j \in T$;

$\delta_j - \delta_{ij} \leq v_i$, for all $i \in T$ and $j \leq i$;

$\underline{d} - \delta_{ij} \leq v_i$, for all $t \leq i < j \leq T$;

$d_k \leq m_i$, for all $k \in [i]$ and $i \in I$;

$\underline{d} \leq d_i \leq \overline{d}$ for all $i \in I \cdot I$.

The objective function corresponds to the sum of discharge amounts over a set of time slots assuming that we maintain the online-to-offline ratio of peak-demand reduction to be no more than n from the current time slot to T. Similar to CR-Comp(I), the constraints of AdaCR-Threshold ($\pi$, I) are due to the offline PRM problem solved in each time slot under the adaptive pCR-PRM. By similar arguments for computing the best CR $\pi^*$, we conclude that the adaptive CR at time slot t should be the smallest ratio $\pi$ in $[\pi_{lb}{}^t, \pi_{t-1}{}^*]$ such that $\max_{I \in I_t}$ AdaCR-Threshold ($\pi$, I) does not exceed the remaining inventory $$c - \sum_{k=1}^{t-1} \delta k.$$

Therefore, we can search for $\pi_t{}^*$ by the bisection method clarified in Algorithm 3. Together with Algorithm 3, the present invention completes the introduction of Algorithm 2 and now summarize the theoretical performance in the following proposition.

Proposition 14. At each time slot t, Algorithm 2 achieves the optimal adaptive competitive ratio among all algorithms in $\mathcal{A}_t$.

If the input sequence d is in the worst case regarding pCR-PRM ($\pi^*$), then $\pi_t{}^*=\pi^*$, for all $t \in [T]$. Otherwise, there is an index $\tau \in [T]$ such that $\pi_t{}^*<\pi^*$, for all $t \geq \tau$. From this perspective, we show that the adaptive pCR-PRM also attains the optimal CR among all online algorithms for PRM; moreover, it outperforms pCR-PRM ($\pi^*$) under general cases.

The following simulation considers a scenario where an EV charging station operator uses its storage to reduce its peak demand in a day. We obtain three-month electricity data from an EV charging station in Shenzhen, China. We divide the time into slots with 15-min length and derive the power demand of the charging station at each slot from the data. We then identify the on-peak duration in a day from the data. In particular, we consider a decision period of T=20 slots and set the demand bounds as $\underline{d}$, $\overline{d}$=442.91, 1020.10 kWh, which are the minimum and maximum demand of the charging station in this three months, respectively.

pCR-PRM ($\pi^*$) and Adaptive pCR-PRM

Figure 3:
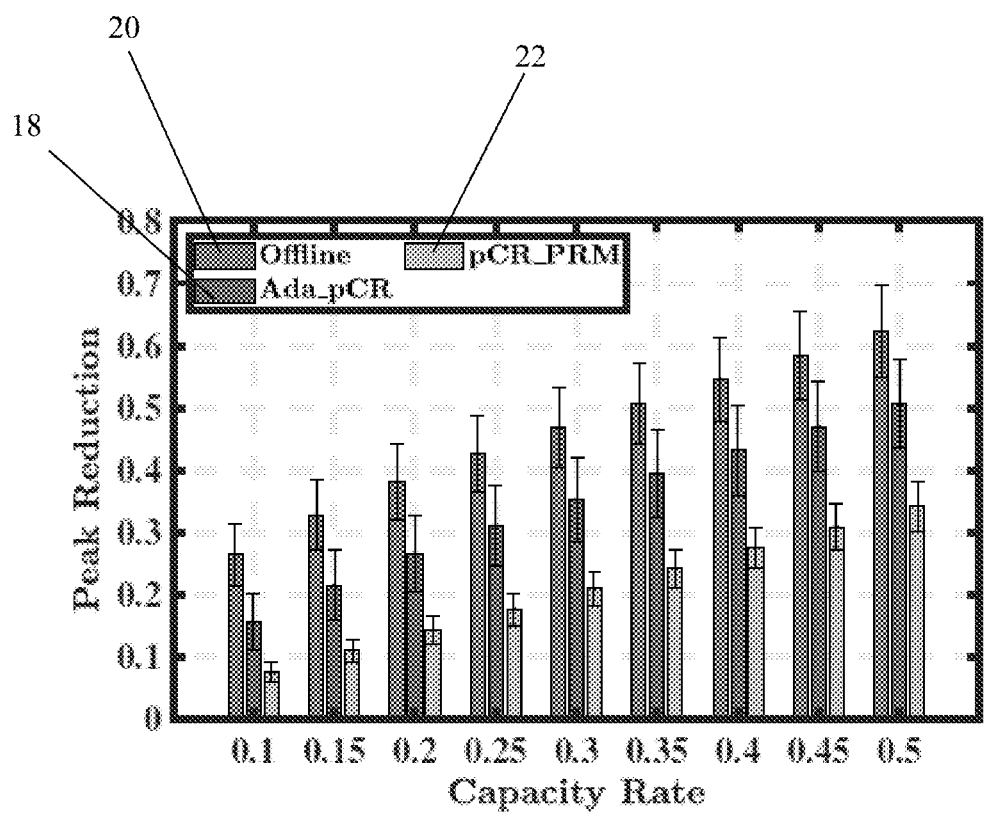
FIG. 3 is a graph illustrating peak-demand reduction under optimal offline solutions, a prescribed ratio algorithm to obtain the best possible CR based on worst case performance and an extension of the prescribed ratio algorithm adaptively exploiting previously revealed slots.
Figure 4:
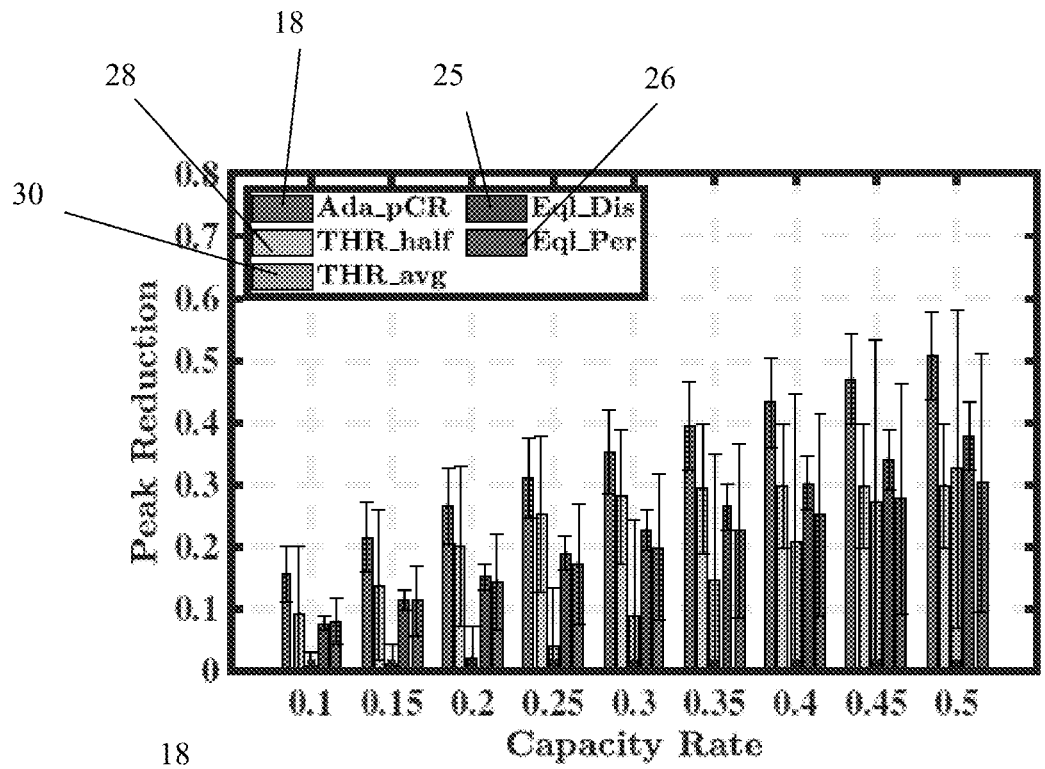
FIG. 4 is a graph illustrating peak-demand reduction under four threshold-based algorithms and the prescribed ratio algorithm adaptively exploiting previously revealed slots.

We evaluate the performance of these two algorithms (ref. pCR_PRM and Ada_pCR) under different storage capacities and show the results in FIG. 3 displaying peak reduction against capacity rate for offline 20, pCR_PRM ($\pi^*$) (22) and Adaptive pCR_PRM (18). The capacity rate represents the ratio between the storage capacity and the average daily demand of the charging station in the specified on-peak period. The peak reduction refers to the average peak reduction rate, which is the average ratio between the peak reduction achieved by respective algorithms and the original peak demand. For FIG. 3, we observe that all the algorithms perform better as the capacity increases. Ada_pCR attains a higher peak reduction as compared with pCR_PRM, which corroborates our theoretical findings in Sec. 5. Our online algorithm adaptive pCR-PRM with little future information can achieve 59%~81% of the peak reduction of the optimal offline solution derived with perfect information.

Figure 5:
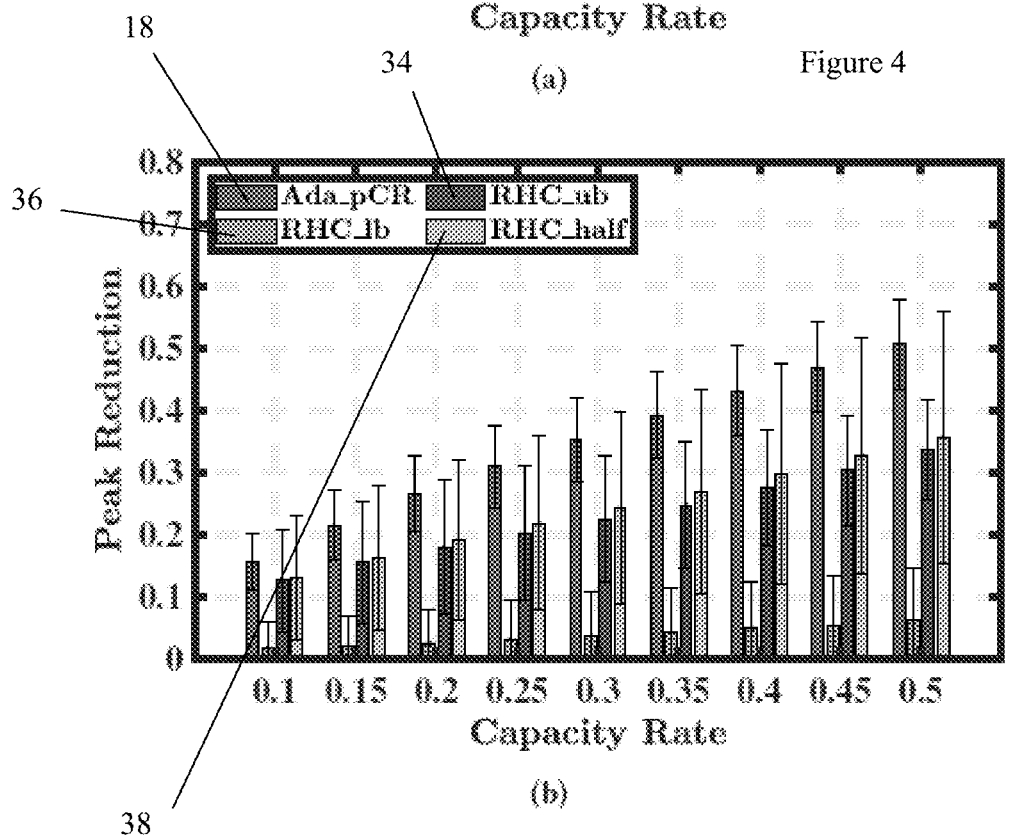
FIG. 5 is a graph illustrating peak-demand reduction under three receding horizon control (RHC) algorithms and the prescribed ratio algorithm adaptively exploiting previously revealed slots.

We mainly compare the adaptive pCR-PRM with two catalogs of conceivable alternatives, naïve threshold-based algorithms and receding horizon control (RHC) algorithms. We show the results in FIG. 5a and FIG. 5b displaying peak reduction against capacity rate for the following alternatives and Adaptive pCR_PRM (18). In particular, the following alternatives are introduced, THR_half (28) or THR_avg (30) represents the algorithm discharging to a threshold at each slot until using up the storage. THR_half (28) sets the threshold as $\underline{d}+\overline{d}/2$, and THR_avg (30) sets the threshold as the average optimal offline peak demand after using the storage Eql_Dis (25) equally distributes the energy storage capacity at each slot. Eql_Per (26) discharges at a constant ratio of the demand at each slot until the capacity is running out, and sets the ratio the same as the capacity rate RHC algorithms assume a look-ahead window of 5 slots (a quarter of the on-peak duration) in our simulation. At each slot, the RHC algorithms first compute the optimal solution based on the demand in the look-ahead window and their guesses beyond the window. Then, it implements the optimal solution at the current slot and recomputes the optimal at the next slot. RHC_lb (36), RHC_ub (34), and RHC_half (38) assume the demand beyond the look-ahead window as $\underline{d}$, $\overline{d}$, and $(\underline{d}+\overline{d})/2$, respectively From FIG. 5a, we observe that the adaptive pCR-PRM achieves the largest peak-shaving under different capacity rates, with at least 23% improvement against threshold-based algorithms. We observe from the FIG. 5b that the adaptive pCR-PRM has at least 20% improvement and a relatively small deviation on the peak reduction as compared to the RHC algorithms.

Impact of Discharging Limit

Figure 6:
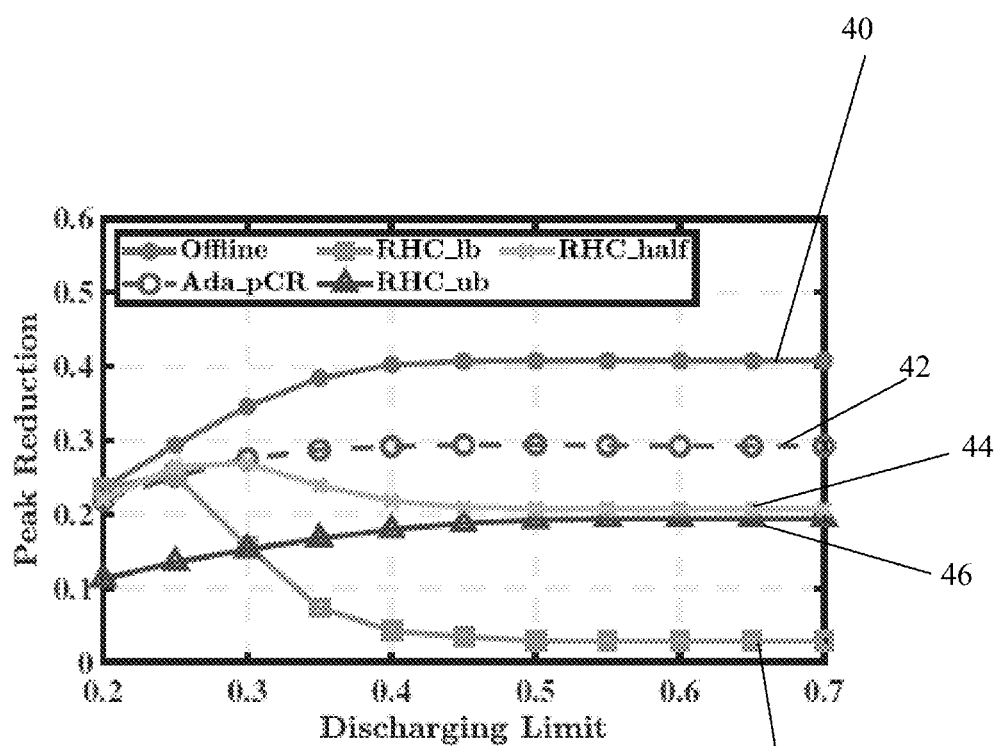
FIG. 6 is a graph illustrating the effects of maximum discharge rates using the method of the present invention.

The present invention evaluates the performance of the adaptive pCR-PRM under different maximum charging rates and compare it with alternatives. The results are shown in FIG. 6 plotting peak reduction against discharge limit for adaptive pCR-PRM (42), offline (40), RHC_lb (48), RHC_ub (46), and RHC_half (38). We normalize the discharging rate limit by the upper bound $\overline{d}$ of the demand at a slot. We observe that the adaptive pCR-PRM has close performance under different discharging limits, while the optimal offline achieves greater peak reduction as the discharging limit increases. Without knowing the future demand, the adaptive pCR-PRM with a larger charging rate limit may waste more energy at the previously observed peak demand which turns out not to be the peak in the whole period. This prevents the adaptive pCR-PRM from obtaining higher peak reduction at a larger discharging rate limit. Furthermore, the adaptive pCR-PRM outperforms other alternatives under different charging rate limits.

We study an online storage-assisted peak-reduction maximization problem. We focus on a scenario that a large-load power consumer with self-owned renewable generation uses energy storage to reduce its net peak demand during the on-peak period.

An optimal algorithm pCR-PRM ($\pi^*$) that achieves the best CR among all online algorithms is derived. We obtain the best CR $\pi^*$ by solving a linear number of linear-fractional programs. We further extend our algorithm to an adaptive one by exploiting observed inputs in realtime. The adaptive pCR-PRM achieves the best adaptive CR at each time slot given the revealed inputs and online decisions so far. It improves the average-case performance while maintaining the worst-case performance. Finally, the adaptive pCR-PRM achieves close performance with the optimal offline solution with perfect information and outperforms conceivable alternatives.

Modifications and variations such as would be apparent to the skilled addressee are considered to fall within the scope of the present invention. The present invention is not to be limited in scope by any of the specific embodiments described herein. These embodiments are intended for the purpose of exemplification only. Functionally equivalent products, formulations and methods are clearly within the scope of the invention as described herein.

Reference to positional descriptions, such as lower and upper, are to be taken in context of the embodiments depicted in the figures, and are not to be taken as limiting the invention to the literal interpretation of the term but rather as would be understood by the skilled addressee.

Throughout this specification, unless the context requires otherwise, the word "comprise" or variations such as "comprises" or "comprising", will be understood to imply the inclusion of a stated integer or group of integers but not the exclusion of any other integer or group of integers.

Also, future patent applications maybe filed, locally or overseas on the basis of, or claiming priority from, the present application. It is to be understood that the following provisional claims are provided by way of example only, and are not intended to limit the scope of what may be claimed in any such future application. Features may be added to or omitted from the provisional claims at a later date so as to further define or re-define the invention or inventions.

The invention claimed is:

1. A computational method of real-time electrical energy storage management from an electricity storage device to maximise a reduction of a use of a mains electricity grid during peak cost charging periods on the mains electricity grid, the method including:
   calculating, by a processor, an ideal offline use of the electricity storage device using ideal predicted parameters;
   calculating a plurality of electrical storage device storage and electrical discharge models using a plurality of algorithms based on recorded data;
   calculating a competitive ratio for each algorithm in the plurality of algorithms and the ideal offline use; and
   using power from the electricity storage device based on an optimal competitive ratio, wherein the optimal competitive ratio is obtained by taking a maximum of an exponential number of linear-fractional programs and restricting a number of linear-fractional programs based on a specified number of time intervals T.

2. The method as claimed in claim 1, wherein one algorithm in the plurality of algorithms is an adaptive algorithm.

3. The method as claimed in claim 2, wherein the adaptive algorithm uses information revealed in earlier steps of the adaptive algorithm.

4. The method as claimed in claim 1, wherein at least one algorithm in the plurality of algorithms calculates based on data in real time.

5. The method as claimed in claim 1, wherein at least one algorithm in the plurality of algorithms calculates a best possible competitive ratio.

6. The method as claimed in claim 1, wherein the competitive ratio is measured against at least one of the following:
   a scaled storage energy capacity;
   a lower bound of a net electricity demand;
   an upper bound of the net electricity demand; and
   a maximum electrical discharge.

7. The method as claimed in claim 1, wherein a representative ideal offline use is selected based on the competitive ratio.

8. A method of real-time electrical energy storage management from an electricity storage device to maximise a reduction of a use of a mains electricity grid during peak cost charging periods on the mains electricity grid, the method including:
   calculating an ideal offline use of the electricity storage device using ideal predicted parameters;
   calculating a plurality of electrical storage device storage and electrical discharge models using a plurality of algorithms based on recorded data;
   calculating a competitive ratio for each algorithm in the plurality of algorithms and the ideal offline use; and
   using power from the electricity storage device based on an optimal competitive ratio, wherein the optimal competitive ratio is obtained by taking a maximum of an exponential number of linear-fractional programs and restricting a number of linear-fractional programs based on a specified number of time intervals T.

9. The method as claimed in claim 8, wherein one algorithm in the plurality of algorithms is an adaptive algorithm.

10. The method as claimed in claim 9, wherein the adaptive algorithm uses information revealed in earlier steps of the adaptive algorithm.

11. The method as claimed in claim 8, wherein at least one algorithm in the plurality of algorithms calculates based on data in real time.

12. The method as claimed in claim 8, wherein at least one algorithm in the plurality of the algorithms calculates a best possible competitive ratio.

* * * * *